United States Patent
Thompson et al.

(10) Patent No.: US 11,152,960 B2
(45) Date of Patent: *Oct. 19, 2021

(54) CARRIER AGGREGATION USING DIPLEXERS

(71) Applicant: SKYWORKS SOLUTIONS, INC., Woburn, MA (US)

(72) Inventors: Philip H. Thompson, Cedar Rapids, IA (US); Roman Zbigniew Arkiszewski, Oak Ridge, NC (US); Joshua James Caron, Madison, NC (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,275

(22) Filed: Aug. 23, 2019

(65) Prior Publication Data

US 2019/0379409 A1  Dec. 12, 2019

Related U.S. Application Data

(63) Continuation of application No. 15/177,125, filed on Jun. 8, 2016, now Pat. No. 10,432,235.

(60) Provisional application No. 62/173,237, filed on Jun. 9, 2015.

(51) Int. Cl.
| | | |
|---|---|---|
| *H04B 1/00* | (2006.01) | |
| *H04B 7/04* | (2017.01) | |
| *H04L 12/26* | (2006.01) | |
| *H04W 52/52* | (2009.01) | |
| *H04W 84/04* | (2009.01) | |

(52) U.S. Cl.
CPC ............ *H04B 1/0057* (2013.01); *H04B 7/04* (2013.01); *H04B 2201/70724* (2013.01); *H04W 84/042* (2013.01)

(58) Field of Classification Search
CPC ............ H04B 7/04; H04B 2201/70724; H04B 1/0057; H04W 84/042
See application file for complete search history.

(56) References Cited

U.S. PATENT DOCUMENTS

| | | | | |
|---|---|---|---|---|
| 8,867,572 | B1 * | 10/2014 | Zhan | H04W 16/26 370/497 |
| 9,300,350 | B2 * | 3/2016 | Baudin | H04B 1/401 |
| 10,128,872 | B2 * | 11/2018 | Langer | H04W 72/0453 |

(Continued)

*Primary Examiner* — Luat Phung
(74) *Attorney, Agent, or Firm* — Chang & Hale LLP

(57) ABSTRACT

A multiplexing system can include a first diplexer and a second diplexer. The first diplexer can have a first transmit terminal, a first receive terminal, and a first common terminal. The first diplexer can be configured to filter a first transmit signal to a first cellular frequency band and output the filtered first transmit signal. The first diplexer can be further configured to filter a first receive signal to a second cellular frequency band and output the filtered first receive signal. The second diplexer can have a second transmit terminal, a second receive terminal, and a second common terminal. The second diplexer can be configured to filter a second transmit signal to the second cellular frequency band and output the filtered second transmit signal. The second diplexer can be further configured to filter a second receive signal to the first cellular frequency band and output the filtered second receive signal.

20 Claims, 7 Drawing Sheets

(56) References Cited

U.S. PATENT DOCUMENTS

| | | | | |
|---|---|---|---|---|
| 2008/0081578 A1* | 4/2008 | Rofougaran | ............ | H04B 1/04 455/187.1 |
| 2014/0293841 A1* | 10/2014 | Rousu | .................... | H04L 5/001 370/278 |
| 2014/0307570 A1* | 10/2014 | Hong | .................. | H04B 1/3838 370/252 |
| 2014/0308899 A1* | 10/2014 | Chen | ................... | H04B 1/0082 455/42 |
| 2014/0329475 A1* | 11/2014 | Ella | ......................... | H04B 1/52 455/77 |
| 2015/0109977 A1* | 4/2015 | Loh | ........................ | H04L 5/001 370/297 |
| 2015/0207537 A1* | 7/2015 | Cox | ....................... | H04B 1/525 370/278 |
| 2016/0198347 A1* | 7/2016 | Zhan | ........................ | H04B 1/40 455/23 |

* cited by examiner

CARRIER AGGREGATION USING DIPLEXERS

CROSS-REFERENCE TO RELATED APPLICATION(S)

The present application is a continuation of U.S. patent application Ser. No. 15/177,125 filed on Jun. 8, 2016, entitled CARRIER AGGREGATION USING DIPLEXERS, which claims priority to U.S. Provisional Application No. 62/173,237 filed Jun. 9, 2015, entitled CARRIER AGGREGATION USING DIPLEXERS, the disclosures of which are hereby expressly incorporated by reference herein in their entireties.

BACKGROUND

Field

The present disclosure generally relates to multiplexing circuits for carrier aggregation communication.

Description of the Related Art

Many wireless devices such as cellular handsets are configured to support multiple cellular frequency bands. In some implementations, a network of duplex filters, each corresponding to a cellular frequency band, is used to allow simultaneous transmission and reception on a common antenna. However, duplexer filter loss may be significant as the separation between the uplink sub-band and downlink sub-band is small, e.g., approximately 45 to 400 megahertz (MHz). Further, the cost of such duplexers in terms of component prices or power usage may be significant due to the small frequency spacing and sharp filtering requirements.

SUMMARY

In accordance with some implementations, the present disclosure relates to a multiplexing system. The multiplexing system includes a first diplexer having a first transmit terminal, a first receive terminal, and a first common terminal. The first diplexer is configured to filter a first transmit signal received at the first transmit terminal to a first cellular frequency band and output the filtered first transmit signal at the first common terminal. The first diplexer is further configured to filter a first receive signal received at the first common terminal to a second cellular frequency band and output the filtered first receive signal at the first receive terminal. The multiplexing system includes a second diplexer having a second transmit terminal, a second receive terminal, and a second common terminal. The second diplexer is configured to filter a second transmit signal received at the second transmit terminal to the second cellular frequency band and output the filtered second transmit signal at the second common terminal. The second diplexer is further configured to filter a second receive signal received at the second common terminal to the first cellular frequency band and output the filtered second receive signal at the second receive terminal.

In some embodiments, the multiplexing system can further include a first power amplifier having a first output coupled to the first transmit terminal. The first power amplifier can be configured to amplify an unamplified first transmit signal to generate the first transmit signal. In some embodiments, the first power amplifier can be a narrowband power amplifier configured to amplify the first cellular frequency band of the unamplified first transmit signal. In some embodiments, the multiplexing system can further include a second power amplifier having a second output coupled to the second transmit terminal. The second power amplifier can be configured to amplify an unamplified second transmit signal to generate the second transmit signal. In some embodiments, the second power amplifier can be a narrowband power amplifier configured to amplify the second cellular frequency band of the unamplified second transmit signal.

In some embodiments, the multiplexing system can further include a first antenna coupled to the first common terminal and a second antenna coupled to the second common terminal. In some embodiments, the multiplexing system can further include a diversity receiver system and one or more diversity antennas coupled to the diversity receiver system. In some embodiments, the diversity receiver system can include a first filter configured to filter a first diversity signal received at the one or more diversity antennas to the first cellular frequency band. In some embodiments, the diversity receiver system can include a second filter configured to filter a second diversity signal received at the one or more diversity antennas to the second cellular frequency band.

In some embodiments, multiplexing system can further include a first antenna band select switch (BSS) having a first antenna BSS pole, a first antenna BSS throw, and a second antenna BSS throw, the first antenna BSS throw coupled to the first common terminal. In some embodiments, the multiplexing system can further include a third diplexer having a third transmit terminal, a third receive terminal, and a third common terminal coupled to the second antenna BSS throw. The third diplexer can be configured to filter a third transmit signal received at the third transmit terminal to a third cellular frequency band and output the filtered third transmit signal at the third common terminal. The third diplexer further can be configured to filter a third receive signal received at the third common terminal to a fourth cellular frequency band and output the filtered third receive signal at the third receive terminal. In some embodiments, the multiplexing system can further include a first power amplifier band select switch having a first power amplifier band select switch pole, a first power amplifier band select switch throw, and a second power amplifier band select switch throw. The first power amplifier band select switch throw can be coupled to the first transmit terminal and the second power amplifier band select switch throw coupled to the third transmit terminal.

In some embodiments, the first diplexer can be a passive device. In some embodiments, the first diplexer can include a first bandpass filter and a second bandpass filter.

In some embodiments, the first cellular frequency band and the second cellular frequency band can include Universal Mobile Telecommunications System (UMTS) Bands 2 and 5. In some embodiments, the first cellular frequency band and the second cellular frequency band can include Universal Mobile Telecommunications System (UMTS) Bands 4 and 12.

In some implementations, the present disclosure relates to radio-frequency (RF) module including a packaging substrate configured to receive a plurality of components and a multiplexing system implemented on the packaging substrate. The multiplexing system includes a first diplexer having a first transmit terminal, a first receive terminal, and a first common terminal. The first diplexer is configured to filter a first transmit signal received at the first transmit terminal to a first cellular frequency band and output the filtered first transmit signal at the first common terminal. The first diplexer is further configured to filter a first receive signal received at the first common terminal to a second cellular frequency band and output the filtered first receive signal at the first receive terminal. The multiplexing system further includes a second diplexer having a second transmit terminal, a second receive terminal, and a second common terminal. The second diplexer is configured to filter a second transmit signal received at the second transmit terminal to the second cellular frequency band and output the filtered second transmit signal at the second common terminal. The second diplexer is further configured to filter a second receive signal received at the second common terminal to the first cellular frequency band and output the filtered second receive signal at the second receive terminal.

In some embodiments, the RF module can be a front-end module (FEM).

In some embodiments, the multiplexing system can further include a first antenna band select switch having a first antenna band select switch pole, a first antenna band select switch throw, and a second antenna band select switch throw. The first antenna band select switch throw can be coupled to the first common terminal.

In some implementations, the present disclosure relates to a wireless device. The wireless device includes a transceiver configured to generate a radio-frequency (RF) signal. The wireless device includes a front-end module (FEM) in communication with the transceiver. The FEM includes a packaging substrate configured to receive a plurality of components and a multiplexing system implemented on the packaging substrate. The multiplexing system includes a first diplexer having a first transmit terminal, a first receive terminal, and a first common terminal. The first diplexer is configured to filter a first transmit signal received at the first transmit terminal to a first cellular frequency band and output the filtered first transmit signal at the first common terminal. The first diplexer is further configured to filter a first receive signal received at the first common terminal to a second cellular frequency band and output the filtered first receive signal at the first receive terminal. The multiplexing system further includes a second diplexer having a second transmit terminal, a second receive terminal, and a second common terminal. The second diplexer is configured to filter a second transmit signal received at the second transmit terminal to the second cellular frequency band and output the filtered second transmit signal at the second common terminal. The second diplexer is further configured to filter a second receive signal received at the second common terminal to the first cellular frequency band and output the filtered second receive signal at the second receive terminal. The wireless device further includes an antenna in communication with the FEM. The antenna is configured to transmit an amplified version of the RF signal received from the multiplexing system.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Many wireless devices such as cellular handsets are configured to support multiple cellular frequency bands. In some implementations, a network of duplex filters, each corresponding to a cellular frequency band, is used to allow simultaneous transmission and reception on a common antenna. In some implementations, a switch is used to select a single duplexer to perform single-carrier communication, transmission and reception at a single cellular frequency band. In some implementations, one or more switches are used to select multiple duplexers to perform carrier aggregation communication, transmission and reception at multiple cellular frequency bands simultaneously.

Duplexer filter loss may be significant as the separation between the uplink sub-band and downlink sub-band is small, e.g., approximately 45 to 400 megahertz (MHz). Further, the cost of such duplexers in terms of component prices or power usage may be significant due to the small frequency spacing and sharp filtering requirements.

Disclosed herein are various examples of circuits, devices and methods that can be configured to, among other things, address the foregoing challenges associated with carrier aggregation communication systems. In some implementations as described herein, duplexers are replaced with diplexer filters with a wider frequency spacing, e.g., approximately 1000 MHz or greater. Each diplexer is configured to allow simultaneous transmission at one cellular frequency band and reception at another cellular frequency band. The wider frequency spacing as compared to a duplexer may allow the diplexer filter design to be improved in terms of cost, module space, insertion loss, and/or out-of-band attenuation.

Filter insertion loss in the transmission path may be further reduced (e.g., by using a smaller and lower cost power amplifier) since attenuation at the reception frequency can be reduced (e.g., from approximately 55 dB to 45 dB). This lower transmission filter insertion loss may result in less heat dissipation and a longer battery life.

Figure 1:
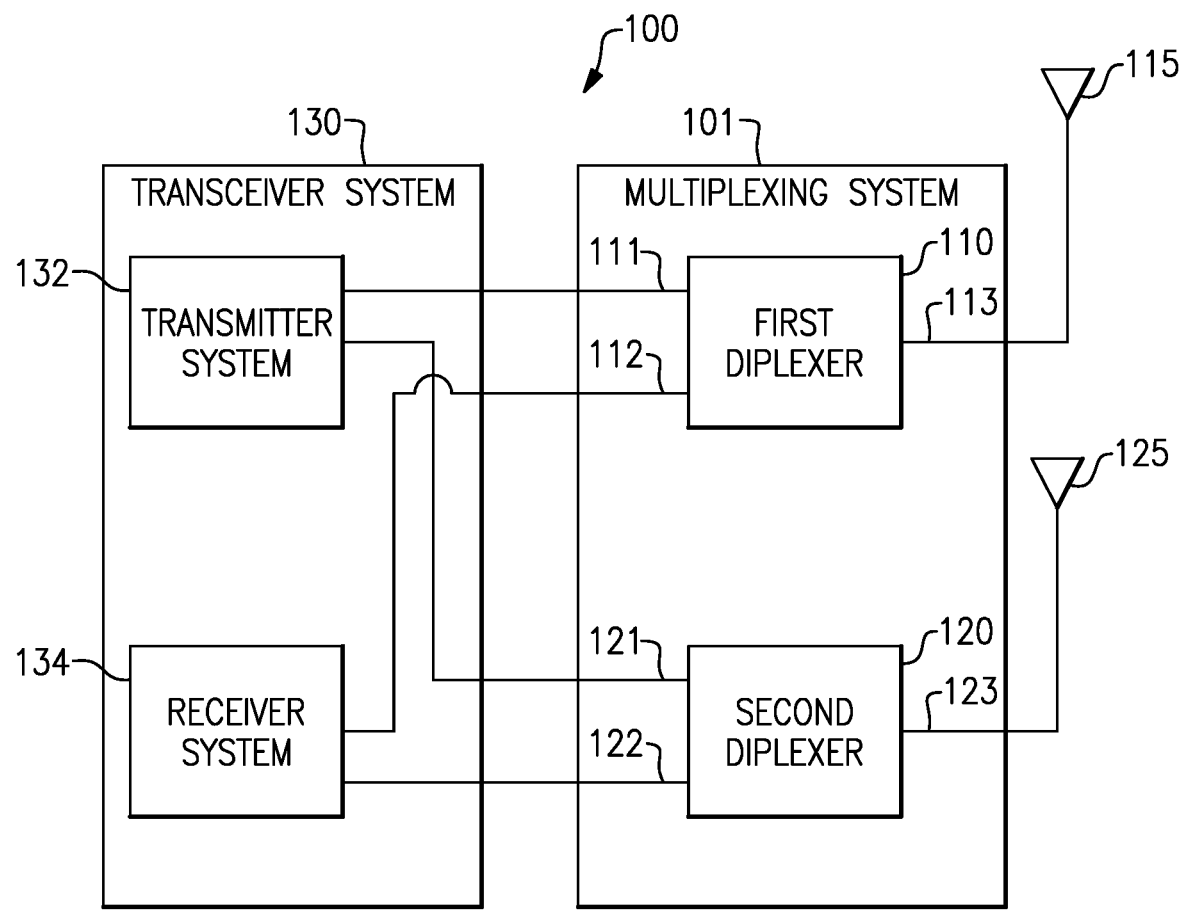
FIG. 1 schematically shows an example wireless communication configuration that includes a multiplexing system with two diplexers.

FIG. 1 schematically shows an example wireless communication configuration 100 that includes a multiplexing system 101 with two diplexers 110, 120. The multiplexing system 101 routes signals between a transceiver system 130 and two antennas 115, 125.

The transceiver system 130 includes a transmitter system 132 that converts digital data signals into radio-frequency (RF) signals for transmission via the antennas 115, 125. To that end, the transmitter system 132 may include a baseband system, a modulator including a local oscillator, a digital-to-analog converter, a power amplifier, and other components. The transceiver system 130 further includes a receiver system 134 that converts received RF signals into digital data signals. To that end, the receiver system 134 may include a low-noise amplifier (LNA), a demodulator including a local oscillator, an analog-to-digital converter, a baseband system, and other components.

The multiplexing system 101 provides signals received via the antennas 115, 125 to corresponding inputs of the receiver system 134. Similarly, the multiplexing system 101 provides signals received from corresponding outputs of the transmitter system 132 to the antennas 115, 125.

The multiplexing system 101, as shown, includes a first diplexer 110 and a second diplexer 120. In some implementations, e.g., as described below, the multiplexing system 101 may include more than two diplexers and/or switching mechanisms. Each diplexer 110, 120 may be a passive device. For example, each diplexer 110, 120 may include two bandpass filters combined to perform the functions of the diplexer as described below. The bandpass filters may be implemented as surface acoustic wave (SAW) filters, LC filters, or any other type of filter.

The first diplexer 110 has three terminals: a first transmit terminal 111 coupled to a first output of the transmitter system 132, a first receive terminal 112 coupled to a first input the receiver system 134, and a first common terminal 113 coupled to the first antenna 115. The first diplexer 110 is configured to filter a first transmit signal received at the first transmit terminal 111 to a first cellular frequency band and output the filtered first transmit signal at the first common terminal 113. The first diplexer 110 is further configured to filter a first receive signal received at the first common terminal 113 to a second cellular frequency band and output the filtered first receive signal at the first receive terminal 112.

The second diplexer 120 also has three terminals: a second transmit terminal 121 coupled to a second output of the transmitter system 132, a second receive terminal 122 coupled to a second input of the receiver system 134, and a second common terminal 123 coupled to the second antenna 125. The second diplexer 120 is configured to filter a second transmit signal received at the second transmit terminal 121 to the second cellular frequency band and output the filtered second transmit signal at the second common terminal 123. The second diplexer 120 is further configured to filter a second receive signal received at the second common terminal 123 to the first cellular frequency band and output the filtered second receive signal at the second receive terminal 122.

The first cellular frequency band and second cellular frequency band may be widely spaced. For example, the first cellular frequency band may be UMTS (Universal Mobile Telecommunications System) Band 2, between 1850 megahertz (MHZ) and 1990 MHz, and the second cellular frequency band may be UMTS Band 5, between 829 MHz and 894 MHz. Each cellular frequency band may include an uplink frequency sub-band and a downlink frequency sub-band. For example, the first cellular frequency band may include an uplink frequency sub-band between 1850 MHz and 1910 MHz and a downlink frequency sub-band between 1930 MHz and 1990 MHz. In some implementations, the first cellular frequency band is UMTS Band 4 and the second cellular frequency band is UMTS Band 12. In some implementations, the first cellular frequency band is UMTS Band 4 and the second cellular frequency band is UMTS Band 17, which is a subset of UMTS Band 12. In some implementations, the first cellular frequency band is UMTS Band 1 and the second cellular frequency band is UMTS Band 8. Other cellular frequency bands may be used, such as those described below in Table 1 or other non-UMTS cellular frequency bands.

Thus, in contrast to a duplexer which allows bi-directional communication for a single cellular frequency band, each diplexer 110, 120 allows directional communication for each of two cellular frequency bands. The first diplexer 110 and second diplexer 120 are complementary in that the first diplexer 110 transmits a signal at a first cellular frequency band and the second diplexer 120 receives a signal at the first cellular frequency band. Similarly, the second diplexer 120 transmits a signal at the second cellular frequency band and the first diplexer 110 receives a signal at the second cellular frequency band. The first diplexer 110 and second diplexer 120 may be used to perform carrier aggregation in which a wireless device transmits and receives signals at two different cellular frequency bands at the same time.

Each antenna 115, 125 may be a wideband antenna that can, at least, transmit and receive the first cellular frequency band and the second cellular frequency band. Each antenna 115, 125 may transmit and receive the first cellular frequency band and the second cellular frequency band without transmitting or receiving frequencies between the two bands. For example, each antenna 115, 125 may include two narrowband antennas and a combiner.

Figure 2:
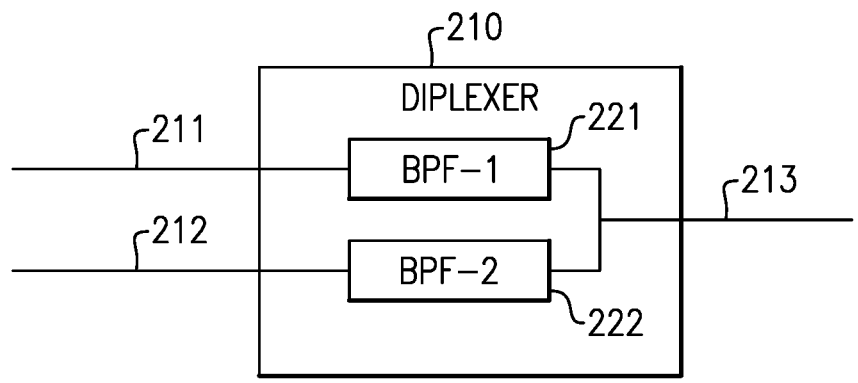
FIG. 2 shows that, in some embodiments, a diplexer may include two bandpass filters.

FIG. 2 shows that, in one embodiment, a diplexer 210 may include two bandpass filters 221, 222. The diplexer 210 includes three terminals, a transmit terminal 211 coupled to the input of a first bandpass filter 221, a receive terminal 212 coupled to the output of a second bandpass filter 222, and a common terminal 213 coupled to both the output of the first bandpass filter 221 and the input of the second bandpass filter 222.

The first bandpass filter 221 may filter a signal at the input of the first bandpass filter 221 to a first cellular frequency band or to an uplink sub-band of a first cellular frequency band. Similarly, the second bandpass filter 222 may filter a signal at the input of the second bandpass filter 222 to a second cellular frequency band or to a downlink sub-band of a second cellular frequency band.

Although FIG. 2 illustrates a particular diplexer configuration including two bandpass filters, other diplexer configurations may be implemented in the systems described herein.

Figure 3:
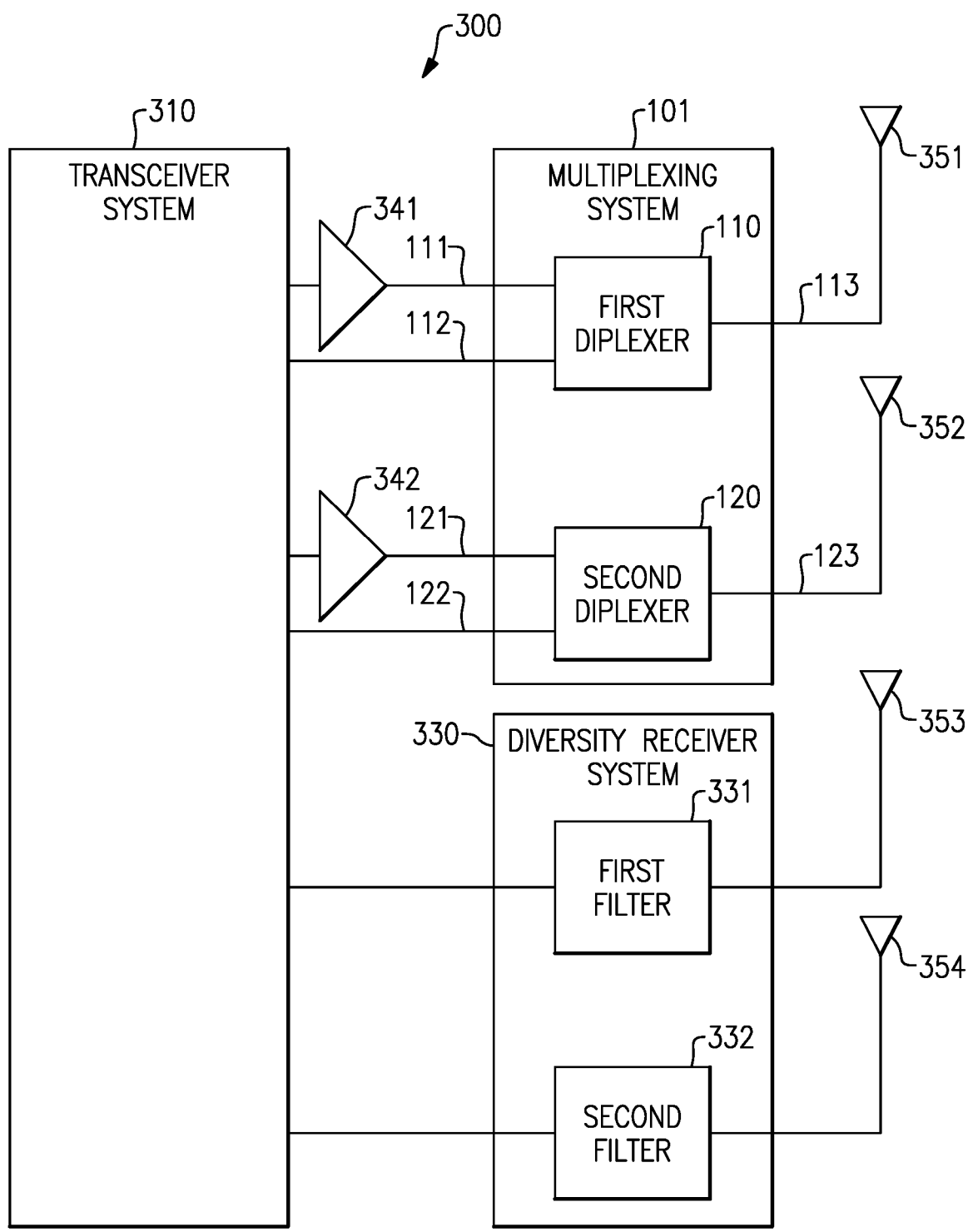
FIG. 3 shows that, in some embodiments, the multiplexing system of FIG. 1 may be implemented in a wireless communication configuration including a diversity receiver system.

FIG. 3 shows that, in some embodiments, the multiplexing system 101 of FIG. 1 may be implemented in a wireless communication configuration 300 including a diversity receiver system 330.

As described above, the multiplexing system 101 includes a first diplexer 110 and a second diplexer 120. The first diplexer 110 has a first transmit terminal 111, a first receive terminal 112, and a first common terminal 113. The first transmit terminal 111 is coupled, via a first power amplifier 341, to a first cellular frequency band transmit output of the transceiver system 310. The first power amplifier 341 has a first output coupled to the first transmit terminal 111 and is configured to amplify an unamplified first transmit signal to generate a first transmit signal. The first power amplifier 341 may be a narrowband power amplifier configured to amplify the first cellular frequency band of the unamplified first transmit signal. The first cellular frequency band transmit output of the transceiver system 310 may output, as the unamplified first transmit signal, an RF signal to be transmitted at the first cellular frequency band.

The first receive terminal 112 is coupled to a second cellular frequency band receive input of the transceiver system 310. The second cellular frequency band receive input of the transceiver system 310 may receive an RF signal for processing at the second cellular frequency band.

The first common terminal 113 is coupled to a first antenna 351. The first antenna 351 may be a wideband antenna that can transmit and receive at both the first cellular frequency band and the second cellular frequency band.

The first diplexer 110 is configured to filter a first transmit signal received at the first transmit terminal 111 (from the first power amplifier 341) to a first cellular frequency band and output the filtered first transmit signal at the first common terminal 113. The first diplexer 110 is further configured to filter a first receive signal received at the first common terminal 113 to a second cellular frequency band and output the filtered first receive signal at the first receive terminal 112.

The second diplexer 120 has a second transmit terminal 121, a second receive terminal 122, and a second common terminal 123. The second transmit terminal 121 is coupled, via a second power amplifier 342, to a second cellular frequency band transmit output of the transceiver system 310. The second power amplifier 342 has a second output coupled to the second transmit terminal 121 and is configured to amplify an unamplified second transmit signal to generate a second transmit signal. The second power amplifier 341 may be a narrowband power amplifier configured to amplify the second cellular frequency band of the unamplified second transmit signal. The second cellular frequency band transmit output of the transceiver system 310 may output, as the unamplified second transmit signal, an RF signal to be transmitted at the second cellular frequency band.

The second receive terminal 122 is coupled to a first cellular frequency band receive input of the transceiver system 310. The first cellular frequency band receive input of the transceiver system 310 may receive an RF signal for processing at the first cellular frequency band.

The second common terminal 123 is coupled to a second antenna 352. The second antenna 352 may be, like the first antenna 351, a wideband antenna that can transmit and receive at both the first cellular frequency band and the second cellular frequency band.

The second diplexer 120 is configured to filter a second transmit signal received at the second transmit terminal 121 (from the second power amplifier 342) to the second cellular frequency band and output the filtered second transmit signal at the second common terminal 123. The second diplexer 120 is further configured to filter a second receive signal received at the second common terminal 123 to the first cellular frequency band and output the filtered second receive signal at the second receive terminal 122.

The wireless communication configuration 300 includes a diversity receiver system 330 and one or more diversity antennas coupled to the diversity receiver system. As shown in FIG. 3, the wireless communication configuration 300 includes a first diversity antenna 353 and a second diversity antenna 354.

The diversity receiver system 330 includes a first filter 331 configured to filter a first diversity signal received at the one or more diversity antennas to the first cellular frequency band. As shown in FIG. 3, the first filter 331 is configured to receive a first diversity signal from the first diversity antenna 353, filter the first diversity signal to the first cellular frequency band, and provide the filtered first diversity signal to a first cellular frequency band diversity input of the transceiver system 310.

Similarly, the diversity receiver system 330 includes a second filter 332 configured to filter a second diversity signal received at the one or more diversity antennas to the second cellular frequency band. As shown in FIG. 3, the second filter 332 is configured to receive a second diversity signal from the second diversity antenna 354, filter the second diversity signal to the second cellular frequency band, and provide the filtered second diversity signal to a second cellular frequency band diversity input of the transceiver system 310.

The transceiver system 310 may use the signals received at the first cellular frequency band receive input and the first cellular frequency band diversity input together to generate data bits based on a signal (or a portion of a carrier aggregation signal) wirelessly transmitted at the first frequency. Similarly, the transceiver system 310 may use the signals received at the second cellular frequency band receive input and the second cellular frequency band diversity input together to generate data bits based on a signal (or a portion of a carrier aggregation signal) wirelessly transmitted at the second frequency.

Figure 4:
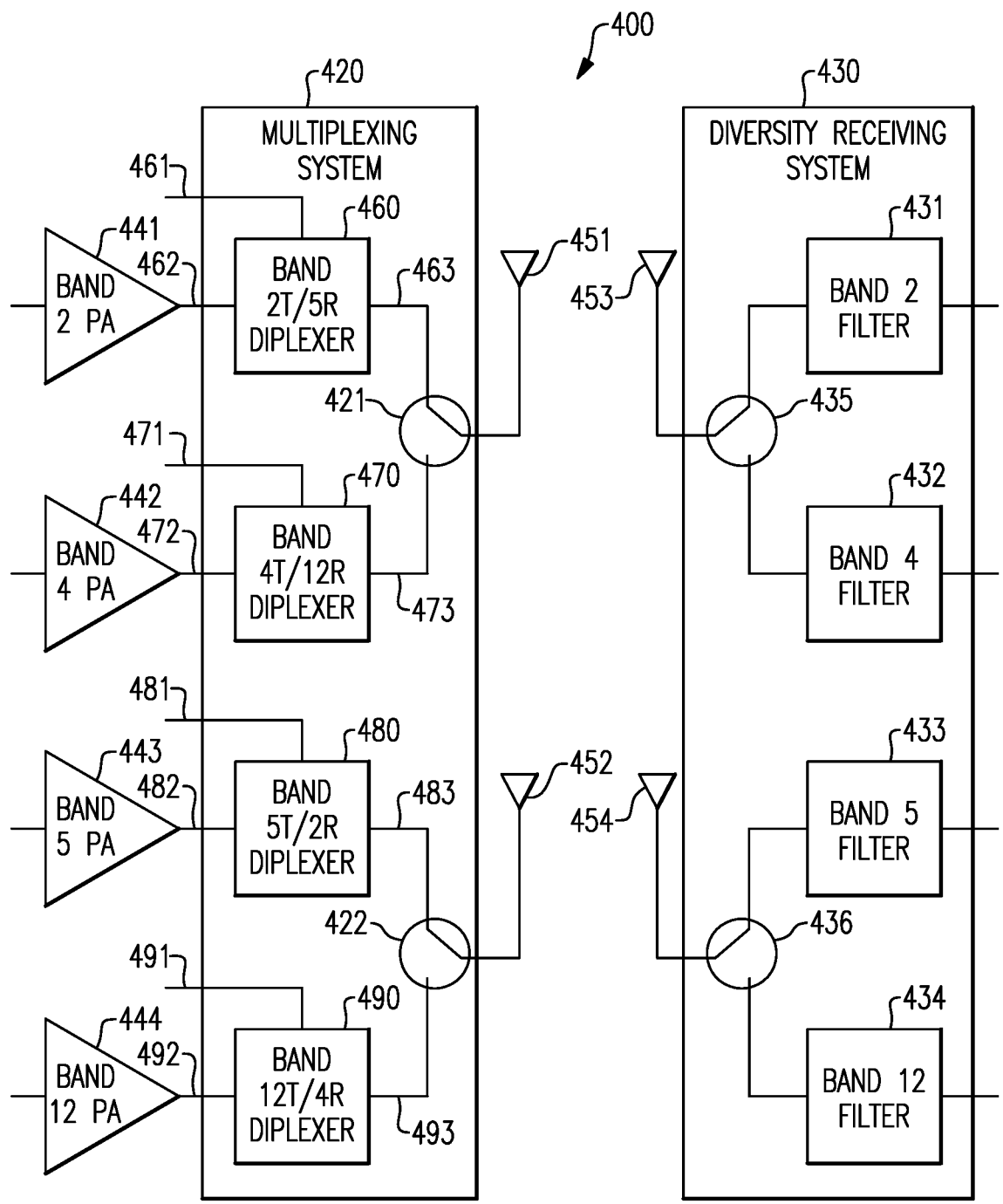
FIG. 4 shows that, in some embodiments, a wireless communication configuration may include a multiplexing system with multiple diplexer sets.

FIG. 4 shows that, in one embodiment, a wireless communication configuration 400 may include a multiplexing system 420 with multiple diplexer sets. The multiplexing system 420 includes a first diplexer 460 having a first transmit terminal 462, a first receive terminal 461, and a first common terminal 463. The first diplexer 460 is configured to filter a first transmit signal received at the first transmit terminal 462 to a first cellular frequency band and output the filtered first transmit signal at the first common terminal 463. The first diplexer 460 is further configured to filter a first receive signal received at the first common terminal 463 to a second cellular frequency band and output the filtered first receive signal at the first receive terminal 461.

The multiplexing system 420 includes a second diplexer 480 having a second transmit terminal 482, a second receive terminal 481, and a second common terminal 483. The second diplexer 480 is configured to filter a second transmit signal received at the second transmit terminal 482 to the second cellular frequency band and output the filtered second transmit signal at the second common terminal 483. The second diplexer 480 is further configured to filter a second receive signal received at the second common terminal 483 to the first cellular frequency band and output the filtered second receive signal at the second receive terminal 481. The first cellular frequency band may be UMTS Band 2 and the second cellular frequency band may be UMTS Band 5.

The first transmit terminal 462 is coupled to the output of a first power amplifier 441 and the second transmit terminal 482 is coupled to the output of a second power amplifier 443. The first power amplifier 441 may be a narrowband power amplifier that amplifies the first cellular frequency band (e.g., Band 2) and the second power amplifier 443 may be a narrowband power amplifier that amplifies the second cellular frequency band (e.g., Band 5).

The first diplexer 460 may receive the first transmit signal from a first cellular frequency band transmit output of a transceiver system and provide the first receive signal to a second cellular frequency band receive input of the transceiver system. Conversely, the second diplexer 480 may receive the second transmit signal from a second cellular frequency band transmit output of the transceiver system and provide the second receive signal to a first cellular frequency band receive input of the transceiver system.

Thus, the multiplexing system 420 includes a first diplexer 460 and second diplexer 480 that may be used to perform carrier aggregation of the first cellular frequency band and second cellular frequency band. The multiplexing system 420 further includes a third diplexer 470 and a fourth diplexer 490 that may be used to perform carrier aggregation of a third cellular frequency band and a fourth cellular frequency band.

In particular, the third diplexer has a third transmit terminal 472, a third receive terminal 471, and a third common terminal 473. The third diplexer 470 is configured to filter a third transmit signal received at the third transmit terminal 472 to a third cellular frequency band and output the filtered third transmit signal at the third common terminal 473. The third diplexer 470 is further configured to filter a third receive signal received at the third common terminal 473 to a fourth cellular frequency band and output the filtered third receive signal at the third receive terminal 471.

The fourth diplexer 490 has a fourth transmit terminal 492, a fourth receive terminal 491, and a fourth common terminal 493. The fourth diplexer 490 is configured to filter a fourth transmit signal received at the fourth transmit terminal 492 to the fourth cellular frequency band and output the filtered fourth transmit signal at the fourth common terminal 493. The fourth diplexer 490 is further configured to filter a fourth receive signal received at the fourth common terminal 493 to the third cellular frequency band and output the filtered fourth receive signal at the fourth receive terminal 491. The third cellular frequency band may be UMTS Band 4 and the fourth cellular frequency band may be UMTS Band 12 (or UMTS Band 17).

The third transmit terminal 472 is coupled to the output of a third power amplifier 442 and the fourth transmit terminal 492 is coupled to the output of a fourth power amplifier 444. The third power amplifier 442 may be a narrowband power amplifier that amplifies the third cellular frequency band (e.g., Band 4) and the fourth power amplifier 444 may be a narrowband power amplifier that amplifies the fourth cellular frequency band (e.g., Band 12 or Band 17).

The third diplexer 470 may receive the third transmit signal from a third cellular frequency band transmit output of a transceiver system and provide the third receive signal to a fourth cellular frequency band receive input of the transceiver system. Conversely, the fourth diplexer 490 may receive the fourth transmit signal from a fourth cellular frequency band transmit output of the transceiver system and provide the fourth receive signal to a third cellular frequency band receive input of the transceiver system.

The multiplexing system 420 includes two antenna band select switches used in conjunction to select between a first set of cellular frequency bands (e.g., Bands 2 and 5) and a second set of cellular frequency bands (e.g., Bands 4 and 12). For example, the first antenna band select switch (BSS) 421 may have a pole coupled to a first antenna 451, a first throw coupled to the first common terminal 463, and a second throw coupled to the third common terminal 473. Similarly, a second antenna BSS 422 may have a pole coupled to a second antenna 452, a first throw coupled to the second common terminal 483, and a second throw coupled to the fourth common terminal 493.

In a first position of the two antenna band select switches (up in FIG. 4), the wireless communication configuration 400 may be used to perform carrier aggregation of the first cellular frequency band and the second cellular frequency band. In a second position of the two antenna band select switches (down in FIG. 4), the wireless communication configuration 400 may be used to perform carrier aggregation of the third cellular frequency band and the fourth cellular frequency band.

In some implementations, the multiplexing system 420 includes additional diplexer pairs for carrier aggregation of different pairs of cellular frequency bands. Similarly, the antenna band select switches 421, 422 may include additional throws for selecting the additional diplexer pairs.

In some implementations, the multiplexing system 420 includes a diplexer pair for UMTS Band 1 and Band 8. In some implementations, the multiplexing system 420 includes a diplexer pair for different combinations of cellular frequency bands supported by other diplexer pairs. For example, the multiplexing system 420 may have a first diplexer pair for UMTS Bands 2 and 5, a second diplexer pair for UMTS Bands 4 and 12, a third diplexer pair for UMTS Bands 2 and 12, and a fourth diplexer pair for UMTS Bands 4 and 5.

The wireless communication configuration 400 includes a diversity receiving system 430 that includes two diversity antenna band select switches 435, 436. The diversity receiving system 430 includes a first filter 431 configured to filter a first diversity signal received at the first diversity antenna 453 to the first cellular frequency band, a second filter 433 configured to filter a second diversity signal received at the second diversity antenna 454 to the second cellular frequency band, a third filter 432 configured to filter a third diversity signal received at the first diversity antenna 453 to the third cellular frequency band, and a fourth filter 434 configured to filter a fourth diversity signal received at the second diversity antenna 454 to the fourth cellular frequency band.

The first diversity antenna BSS 435 has a pole coupled to the first diversity antenna 453, a first throw coupled to the first filter 431, and a second throw coupled to the third filter 432. The second diversity antenna BSS 436 has a pole coupled to the second diversity antenna 454, a first throw coupled to the second filter 433, and a second throw coupled to the fourth filter 434.

In a first position of the two diversity antenna band select switches (up in FIG. 4), the diversity receiving system 430 may be used to assist carrier aggregation of the first cellular frequency band and the second cellular frequency band. In a second position of the two diversity antenna band select switches (down in FIG. 4), the diversity receiving system 430 may be used to assist carrier aggregation of the third cellular frequency band and the fourth cellular frequency band.

The first antenna 451 and second antenna 452 may both be wideband antennas that are configured to receive and transmit at least the first cellular frequency band, second cellular frequency band, third cellular frequency band, and fourth cellular frequency band. Contrastingly, the first diversity antenna 453 and second diversity antenna 454 may be relatively narrowband antennas that are configured to receive and transmit, respectively, at least the first cellular frequency band and third cellular frequency band and at least the second cellular frequency band and the fourth cellular frequency band.

Figure 5:
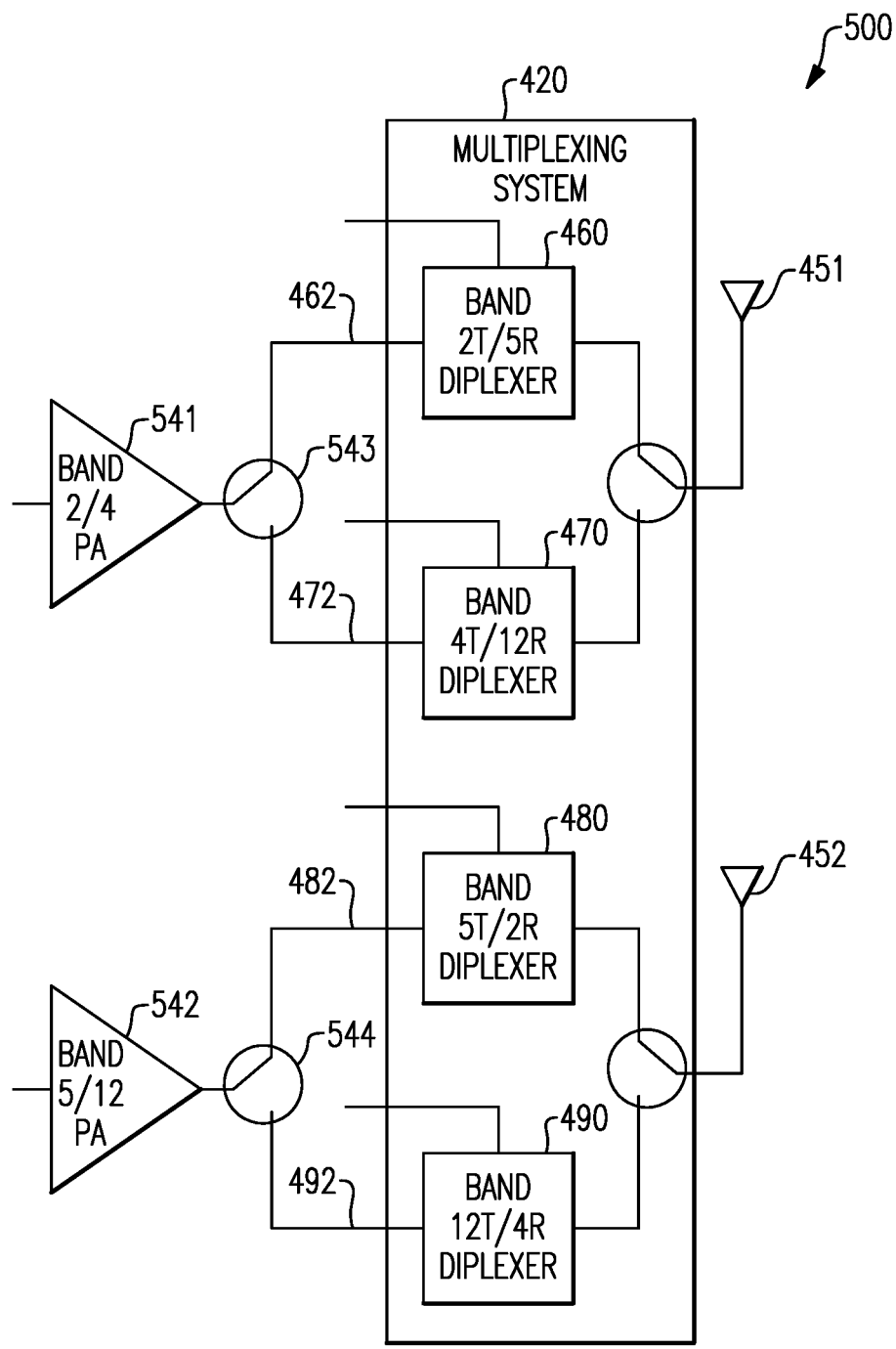
FIG. 5 shows that, in some embodiments, a wireless communication configuration may include power amplifier band select switches.

FIG. 5 shows that, in some embodiments, a wireless communication configuration 500 may include power amplifier band select switches 543, 544. The wireless communication configuration 500 includes the multiplexing system 420 described above with respect to FIG. 4 and two antennas 451, 452. The wireless communication configuration 500 may also include a diversity receiving system (such as the diversity receiving system 430 of FIG. 4), a transceiver system (such as the transceiver system 310 of FIG. 3), or any other component.

The wireless communication configuration 500 of FIG. 5 differs from the wireless communication configuration 400 of FIG. 4 in that the band-specific power amplifiers 441-444 of FIG. 4 are replaced with two relatively wideband power amplifiers 541, 542 and two power amplifier (PA) band select switches 543, 544.

The first power amplifier 541 is configured to amplify at least the first cellular frequency band and the third cellular frequency band (e.g., UMTS Bands 2 and 4) and the second power amplifier 542 is configured to amplify at least the second cellular frequency band and fourth cellular frequency band (e.g., UMTS Bands 5 and 12). In some implementations, both power amplifiers 541, 542 are wideband power amplifiers that are configured to amplify at least the first cellular frequency band, the second cellular frequency band, the third cellular frequency band, and the fourth cellular frequency band.

The first PA BSS 543 has a pole coupled to the output of the first power amplifier 541, a first throw coupled to the first transmit terminal 462 of the first diplexer 460, and a second throw coupled to the third transmit terminal 472 of the third diplexer 470. The second PA BSS 544 has a pole coupled to the output of the second power amplifier 542, a first throw coupled to the second transmit terminal 482 of the second diplexer 480, and a second throw coupled to the fourth transmit terminal 492 of the fourth diplexer 490.

In a first position of the two PA band select switches (up in FIG. 5), the wireless communication configuration 500 may be used to perform carrier aggregation of the first cellular frequency band and the second cellular frequency band. In a second position of the two PA band select switches (down in FIG. 5), the wireless communication configuration 500 may be used to perform carrier aggregation of the third cellular frequency band and the fourth cellular frequency band.

As noted above, in some implementations, the multiplexing system 420 includes additional diplexer pairs for carrier aggregation of different pairs of cellular frequency bands. Similarly, the PA band select switches 543, 544 may include additional throws for selecting the additional diplexer pairs. Further, the power amplifiers 541, 542 may be sufficiently wideband to support the additional cellular frequency bands (e.g., three, four, five, or more cellular frequency bands).

Figure 6:
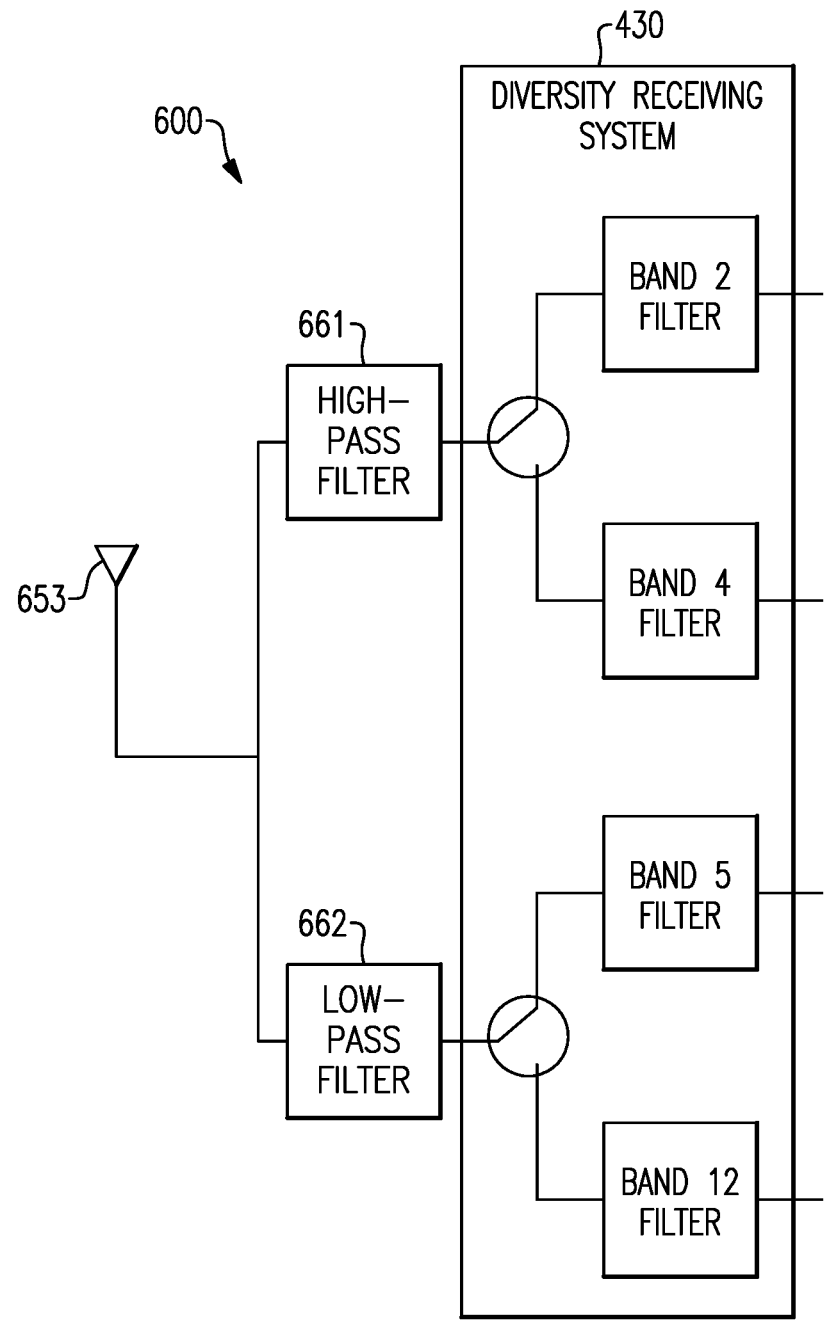
FIG. 6 shows that, in some embodiments, a wireless communication configuration may include a wideband diversity antenna.

FIG. 6 shows that, in one embodiment, a wireless communication configuration 600 may include a wideband diversity antenna 653. The wireless communication configuration 600 includes the diversity receiving system 430 described above with respect to FIG. 4, a wideband diversity antenna 653, and two filters 661, 662. The wireless communication configuration 600 may also include a multiplexing system (such as the multiplexing system 420 of FIG. 4), a transceiver system (such as the transceiver system 310 of FIG. 3), or any other component.

The wireless communication configuration 600 of FIG. 6 differs from the wireless communication configuration 400 of FIG. 4 in that the two diversity antennas 453, 454 of FIG. 4 are replaced with one wideband diversity antenna 653, a high-pass filter 661, and a low-pass filter 662.

The wideband diversity antenna 653 may be configured to receive and transmit at least the first cellular frequency band, second cellular frequency band, third cellular frequency band, and fourth cellular frequency band. The high-pass filter 661 may be configured to filter the signal received from the wideband diversity antenna 653 to pass the first cellular frequency band and third cellular frequency band, but reject the second cellular frequency band and fourth cellular frequency band. Conversely, the low-pass filter 662 may be configured to filter the signal received from the wideband diversity antenna 653 to pass the second cellular frequency band and the fourth cellular frequency band, but reject the first cellular frequency band and fourth cellular frequency band.

Figure 7:
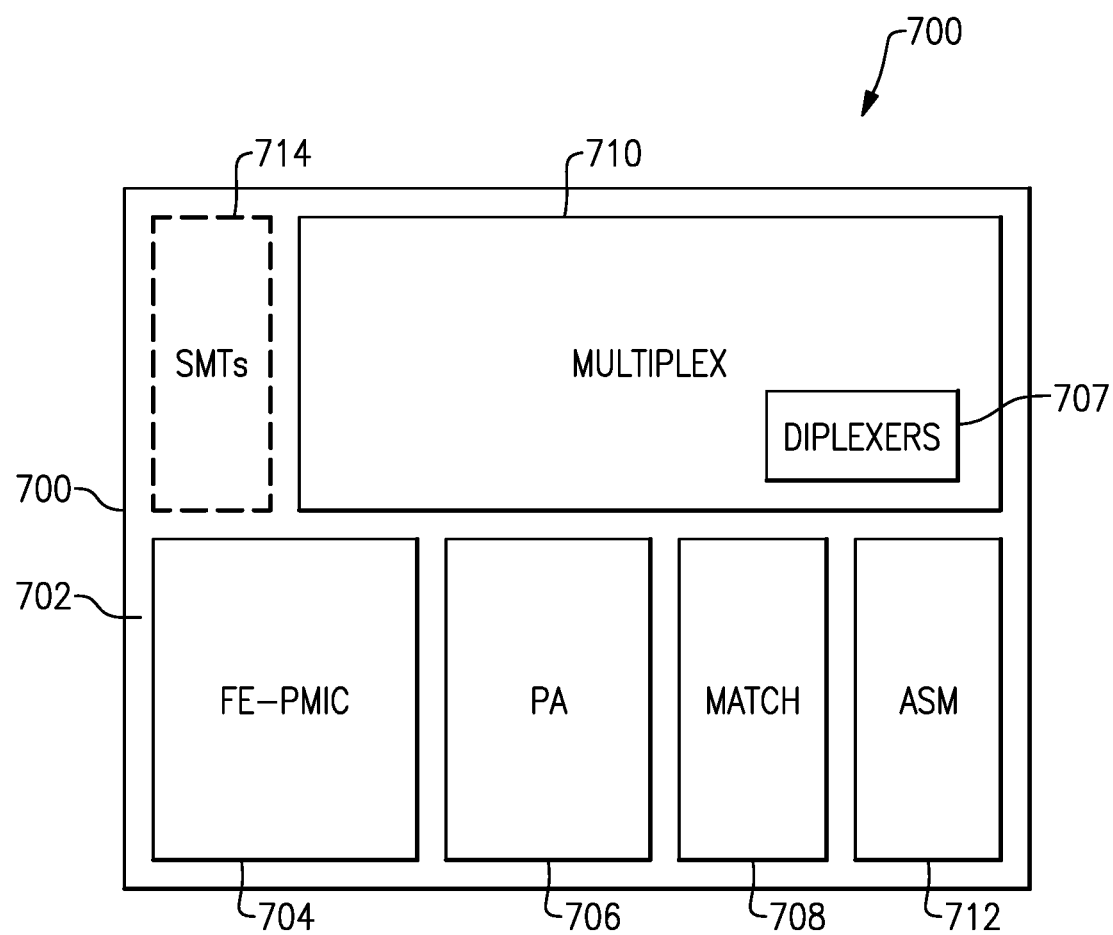
FIG. 7 depicts a module having one or more features as described herein.

FIG. 7 shows that in some embodiments, some or all of wireless communication configurations (e.g., those shown in FIGS. 1, 3, 4, 5, and 6) can be implemented, wholly or partially, in a module. Such a module can be, for example, a front-end module (FEM). In the example of FIG. 7, a module 700 can include a packaging substrate 702, and a number of components can be mounted on such a packaging substrate 702. For example, an FE-PMIC (front-end power management integrated circuit) component 704, a power amplifier assembly 706, a match component 708, and a multiplexer assembly 710 can be mounted and/or implemented on and/or within the packaging substrate 702. The multiplexing assembly 710 may include one or more diplexers 707 that pass, in two directions, two different cellular frequency bands. Other components such as a number of SMT (surface-mount technology) devices 714 and an antenna switch module (ASM) 712 can also be mounted on the packaging substrate 702. Although all of the various components are depicted as being laid out on the packaging substrate 702, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 8:
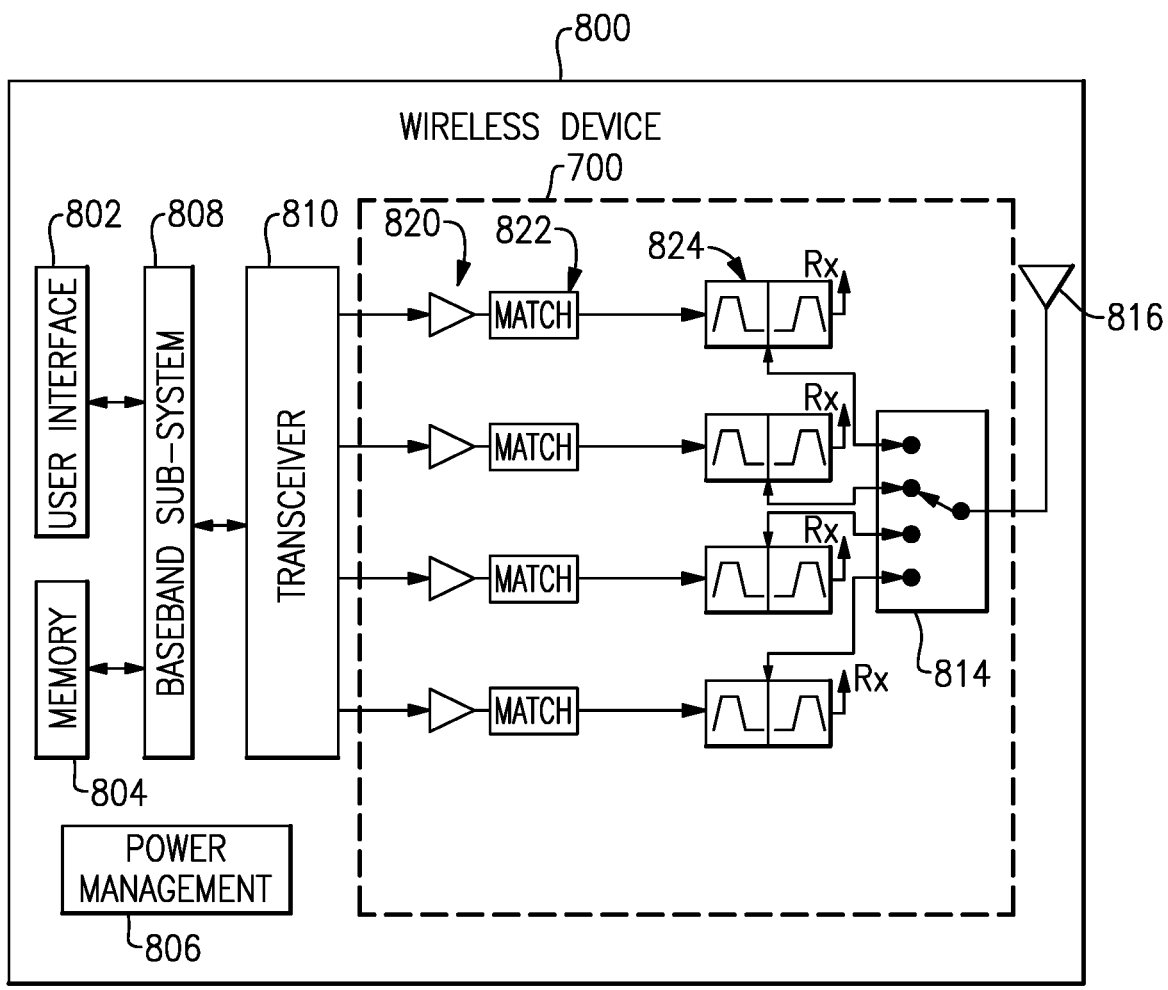
FIG. 8 depicts a wireless device having one or more features described herein.

FIG. 8 depicts an example wireless device 800 having one or more advantageous features described herein. In the context of a module having one or more features as described herein, such a module can be generally depicted by a dashed box 700, and can be implemented as, for example, a front-end module (FEM).

Referring to FIG. 8, power amplifiers (PAs) 820 can receive their respective RF signals from a transceiver 810 that can be configured and operated in known manners to generate RF signals to be amplified and transmitted, and to process received signals. The transceiver 810 is shown to interact with a baseband sub-system 808 that is configured to provide conversion between data and/or voice signals suitable for a user and RF signals suitable for the transceiver 810. The transceiver 810 can also be in communication with a power management component 806 that is configured to manage power for the operation of the wireless device 800. Such power management can also control operations of the baseband sub-system 808 and the module 700.

The baseband sub-system 808 is shown to be connected to a user interface 802 to facilitate various input and output of voice and/or data provided to and received from the user. The baseband sub-system 808 can also be connected to a memory 804 that is configured to store data and/or instructions to facilitate the operation of the wireless device, and/or to provide storage of information for the user.

In the example wireless device 800, outputs of the PAs 820 are shown to be matched (via respective match circuits 822) and routed to their respective diplexers 824. Such amplified and filtered signals can be routed to an antenna 816 (or multiple antennas) through an antenna switch 814 for transmission. In some embodiments, the diplexers 824 can allow transmit and receive operations to be performed simultaneously using a common antenna (e.g., 816). In FIG. 8, received signals are shown to be routed to "Rx" paths (not shown) that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

As described herein, one or more features of the present disclosure can provide a number of advantages when implemented in systems such as those involving the wireless device of FIG. 8. For example, the use of diplexers rather than duplexers may lower the RF path losses between the power amplifier and antenna, reducing cost, size, and heat generation and increasing battery life.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |

TABLE 1-continued

| Band | Mode | Tx Frequency Range (MHz) | Rx Frequency Range (MHz) |
|---|---|---|---|
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A multiplexing system comprising:
a first diplexer configured to filter: a first transmit signal to a first frequency band for a first antenna, and a first receive signal to a second frequency band for the first antenna; and
a second diplexer configured to filter: a second transmit signal to the second frequency band for a second antenna, and a second receive signal to the first frequency band for the second antenna, the second diplexer further configured to filter: the second receive signal to first frequency band at the same time as the first diplexer filters the first transmit signal to the first frequency band, and the second transmit signal to the second frequency band at the same time as the first diplexer filters the first receive signal to the second frequency band.

2. The multiplexing system of claim 1 further comprising a first power amplifier having a first output coupled to the first diplexer, the first power amplifier configured to amplify an unamplified first transmit signal to generate the first transmit signal.

3. The multiplexing system of claim 2 wherein the first power amplifier is a narrowband power amplifier configured to amplify the first frequency band of the unamplified first transmit signal.

4. The multiplexing system of claim 2 further comprising a second power amplifier having a second output coupled to the second diplexer, the second power amplifier configured to amplify an unamplified second transmit signal to generate the second transmit signal.

5. The multiplexing system of claim 4 wherein the second power amplifier is a narrowband power amplifier configured to amplify the second frequency band of the unamplified second transmit signal.

6. The multiplexing system of claim 1 further comprising the first antenna and the second antenna.

7. The multiplexing system of claim 6 further comprising a diversity receiver system and one or more diversity antennas coupled to the diversity receiver system.

8. The multiplexing system of claim 7 wherein the diversity receiver system includes a first filter configured to filter a first diversity signal received at the one or more diversity antennas to the first frequency band.

9. The multiplexing system of claim 8 wherein the diversity receiver system includes a second filter configured to filter a second diversity signal received at the one or more diversity antennas to the second frequency band.

10. The multiplexing system of claim 1 further comprising a first antenna band select switch (BSS) having a first antenna BSS pole, a first antenna BSS throw, and a second antenna BSS throw.

11. The multiplexing system of claim 10 further comprising a third diplexer configured to filter a third transmit signal to a third frequency band, the third diplexer further configured to filter a third receive signal to a fourth frequency band.

12. The multiplexing system of claim 11 further comprising a first power amplifier band select switch having a first power amplifier band select switch pole, a first power amplifier band select switch throw, and a second power amplifier band select switch throw.

13. The multiplexing system of claim 1 wherein the first diplexer is a passive device.

14. The multiplexing system of claim 1 wherein the first diplexer includes a first bandpass filter and a second bandpass filter.

15. The multiplexing system of claim 1 wherein the first frequency band and the second frequency band includes Universal Mobile Telecommunications System (UMTS) Bands 2 and 5.

16. The multiplexing system of claim 1 wherein the first frequency band and the second frequency band includes Universal Mobile Telecommunications System (UMTS) Bands 4 and 12.

17. A radio-frequency (RF) module comprising:
a packaging substrate configured to receive a plurality of components; and
a multiplexing system implemented on the packaging substrate, the multiplexing system including a first diplexer configured to filter a first transmit signal to a first frequency band for a first antenna and a first receive signal to a second frequency band for the first antenna, the multiplexing system further including a second diplexer configured to filter a second transmit signal to the second frequency band for a second antenna and a second receive signal to the first frequency band for the second antenna, the second diplexer further configured to filter: the second receive signal to first frequency band at the same time as the first diplexer filters the first transmit signal to the first frequency band, and the second transmit signal to the second frequency band at the same time as the first diplexer filters the first receive signal to the second frequency band.

18. The RF module of claim 17 wherein the RF module is a front-end module (FEM).

19. The RF module of claim 17 wherein the multiplexing system further includes a first antenna band select switch having a first antenna band select switch pole, a first antenna band select switch throw, and a second antenna band select switch throw.

20. A wireless device comprising:
a transceiver configured to generate a radio-frequency (RF) signal;
a front-end module (FEM) in communication with the transceiver, the FEM including a packaging substrate configured to receive a plurality of components, the FEM further including a multiplexing system implemented on the packaging substrate, the multiplexing system including a first diplexer configured to filter a first transmit signal to a first frequency band for a first antenna and a first receive signal to a second frequency band for the first antenna, the multiplexing system further including a second diplexer configured to filter a second transmit signal to the second frequency band for a second antenna and a second receive signal to the first frequency band for the second antenna, the second diplexer further configured to filter: the second receive signal to first frequency band at the same time as the first diplexer filters the first transmit signal to the first frequency band, and the second transmit signal to the second frequency band at the same time as the first diplexer filters the first receive signal to the second frequency band; and
the first antenna and the second antenna in communication with the FEM, the first antenna and the second antenna configured to transmit an amplified version of the RF signal received from the multiplexing system.

* * * * *